United States Patent
Sherman et al.

(10) Patent No.: US 9,686,145 B2
(45) Date of Patent: Jun. 20, 2017

(54) ADAPTIVE USER INTERFACE FOR MULTI-SOURCE SYSTEMS

(75) Inventors: Itay Sherman, Hod Hasharon (IL); Eyal Bychkov, Hod Hasharon (IL); Yaron Segalov, Tel Aviv (IL); Uriel R. Brison, Tel Aviv (IL)

(73) Assignee: Google Inc., Mountain View, CA (US)

( * ) Notice: Subject to any disclaimer, the term of this patent is extended or adjusted under 35 U.S.C. 154(b) by 990 days.

(21) Appl. No.: 13/612,879

(22) Filed: Sep. 13, 2012

(65) Prior Publication Data

US 2013/0036366 A1 Feb. 7, 2013

Related U.S. Application Data

(62) Division of application No. 12/134,221, filed on Jun. 6, 2008, now Pat. No. 8,316,308.

(Continued)

(51) Int. Cl.
*G06F 3/048* (2013.01)
*H04L 12/24* (2006.01)
(Continued)

(52) U.S. Cl.
CPC ............ *H04L 41/22* (2013.01); *G06F 3/0238* (2013.01); *G06F 3/0481* (2013.01);
(Continued)

(58) Field of Classification Search
None
See application file for complete search history.

(56) References Cited

U.S. PATENT DOCUMENTS

| 5,625,673 A | 4/1997 | Grewe et al. |
| 5,628,055 A | 5/1997 | Stein |

(Continued)

FOREIGN PATENT DOCUMENTS

| EP | 1871075 A1 | 12/2007 |
| WO | 9421058 A1 | 9/1994 |

(Continued)

OTHER PUBLICATIONS

"Advisory Action", U.S. Appl. No. 12/372,812, Nov. 29, 2012, 3 pages.

(Continued)

*Primary Examiner* — Thanh Vu
(74) *Attorney, Agent, or Firm* — Wolfe-SBMC

(57) ABSTRACT

A mufti-source client-host system that maintains a uniform look & feel user interface, including a host device including a central processing unit, a storage memory for storing look & feel parameters for a graphical user interface, the graphical user interface employing a plurality of graphic images for user interaction, and a display for displaying the graphic images employed by the graphical user interface, a client device that can be attached to and detached from the host device, including a central processing unit, and a configuration program for generating at least one of the graphic images employed by the graphical user interface, the at least one of the graphic images conforming to the look & feel parameters, and a communication channel between the host transceiver and the client transceiver, for data transmission.

17 Claims, 13 Drawing Sheets

AFTER ATTACHMENT OF CLIENT AND HOST SADS

Related U.S. Application Data

(60) Provisional application No. 60/933,780, filed on Jun. 8, 2007, provisional application No. 61/066,179, filed on Feb. 19, 2008.

(51) Int. Cl.
- G06F 3/023 (2006.01)
- G06F 3/0481 (2013.01)
- G06F 3/0488 (2013.01)
- H04M 1/725 (2006.01)
- H04L 29/08 (2006.01)

(52) U.S. Cl.
CPC ...... *G06F 3/04886* (2013.01); *H04L 41/0879* (2013.01); *H04M 1/7258* (2013.01); *H04M 1/72527* (2013.01); *H04L 67/34* (2013.01); *H04M 1/72558* (2013.01); *H04M 1/72575* (2013.01)

(56) References Cited

U.S. PATENT DOCUMENTS

| | | |
|---|---|---|
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,285,823 B1 | 9/2001 | Saeki et al. |
| 6,300,947 B1 | 10/2001 | Kanevsky |
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |
| 6,760,415 B2 | 7/2004 | Beecroft |
| 6,834,192 B1 | 12/2004 | Watanabe et al. |
| 6,898,283 B2 | 5/2005 | Wycherley et al. |
| 6,907,264 B1 | 6/2005 | Sterkel |
| 6,999,792 B2 | 2/2006 | Warren |
| 7,020,704 B1 | 3/2006 | Lipscomb et al. |
| 7,085,542 B2 | 8/2006 | Dietrich et al. |
| 7,194,285 B2 | 3/2007 | Tom |
| 7,194,752 B1 | 3/2007 | Kenyon et al. |
| 7,266,391 B2 | 9/2007 | Warren |
| 7,275,244 B1 | 9/2007 | Charles Bell et al. |
| 7,477,919 B2 | 1/2009 | Warren |
| 7,515,937 B2 | 4/2009 | Lee |
| 7,571,014 B1 | 8/2009 | Lambourne et al. |
| 7,747,338 B2 | 6/2010 | Korhonen et al. |
| 7,784,065 B2 * | 8/2010 | Polivy .................. G06F 1/1613 719/328 |
| 8,316,308 B2 | 11/2012 | Sherman |
| 8,457,118 B2 | 6/2013 | Bychkov |
| 8,463,875 B2 | 6/2013 | Katz et al. |
| 9,083,846 B2 | 7/2015 | Bychkov |
| 9,448,814 B2 | 9/2016 | Sherman et al. |
| 2001/0055951 A1 | 12/2001 | Slotznick |
| 2002/0090980 A1 | 7/2002 | Wilcox et al. |
| 2002/0151327 A1 | 10/2002 | Levitt |
| 2003/0008563 A1 | 1/2003 | Nishio et al. |
| 2003/0107529 A1 | 6/2003 | Hayhurst et al. |
| 2003/0200001 A1 | 10/2003 | Goddard |
| 2004/0042601 A1 | 3/2004 | Miao |
| 2004/0052501 A1 | 3/2004 | Tam |
| 2004/0156616 A1 | 8/2004 | Strub et al. |
| 2004/0233930 A1 | 11/2004 | Colby, Jr. |
| 2004/0268005 A1 | 12/2004 | Dickie |
| 2005/0064860 A1 | 3/2005 | DeLine |
| 2005/0070225 A1 | 3/2005 | Lee |
| 2005/0091359 A1 | 4/2005 | Soin et al. |
| 2005/0159184 A1 | 7/2005 | Kerner et al. |
| 2005/0231392 A1 | 10/2005 | Meehan et al. |
| 2005/0276570 A1 | 12/2005 | Reed et al. |
| 2006/0003804 A1 | 1/2006 | Liu |
| 2006/0026652 A1 | 2/2006 | Pulitzer |
| 2006/0033809 A1 | 2/2006 | Farley |
| 2006/0072694 A1 | 4/2006 | Dai et al. |
| 2006/0075439 A1 | 4/2006 | Vance |
| 2006/0105722 A1 | 5/2006 | Kumar |
| 2006/0123053 A1 | 6/2006 | Scannell |
| 2006/0130075 A1 | 6/2006 | Rhoten et al. |
| 2006/0190321 A1 | 8/2006 | Martins Nicho et al. |
| 2006/0235872 A1 | 10/2006 | Kline et al. |
| 2006/0241353 A1 | 10/2006 | Makino et al. |
| 2006/0242590 A1 * | 10/2006 | Polivy .............. G06F 17/30905 715/760 |
| 2007/0004450 A1 | 1/2007 | Parikh |
| 2007/0018957 A1 | 1/2007 | Seo |
| 2007/0053653 A1 | 3/2007 | Huntington |
| 2007/0072589 A1 | 3/2007 | Clarke |
| 2007/0079030 A1 | 4/2007 | Okuley et al. |
| 2007/0139514 A1 | 6/2007 | Marley |
| 2007/0161404 A1 | 7/2007 | Yasujima et al. |
| 2007/0195158 A1 | 8/2007 | Kies |
| 2007/0211907 A1 | 9/2007 | Eo et al. |
| 2007/0226734 A1 * | 9/2007 | Lin ..................... G06F 9/44526 717/177 |
| 2007/0288583 A1 | 12/2007 | Rensin et al. |
| 2008/0009325 A1 | 1/2008 | Zinn et al. |
| 2008/0013659 A1 | 1/2008 | Kim |
| 2008/0013802 A1 | 1/2008 | Lee et al. |
| 2008/0019522 A1 | 1/2008 | Proctor |
| 2008/0026794 A1 | 1/2008 | Warren |
| 2008/0030304 A1 | 2/2008 | Doan et al. |
| 2008/0037674 A1 | 2/2008 | Zurek et al. |
| 2008/0040354 A1 | 2/2008 | Ray et al. |
| 2008/0045140 A1 | 2/2008 | Korhonen |
| 2008/0056285 A1 | 3/2008 | Quinn et al. |
| 2008/0120401 A1 | 5/2008 | Panabaker et al. |
| 2008/0140886 A1 | 6/2008 | Izutsu |
| 2008/0152165 A1 | 6/2008 | Zacchi |
| 2008/0162665 A1 | 7/2008 | Kali |
| 2008/0168368 A1 | 7/2008 | Louch et al. |
| 2008/0212649 A1 | 9/2008 | Jougit |
| 2008/0307315 A1 | 12/2008 | Sherman et al. |
| 2009/0002191 A1 | 1/2009 | Kitaura |
| 2009/0010485 A1 | 1/2009 | Lamb et al. |
| 2009/0158382 A1 | 6/2009 | Shaffer et al. |
| 2009/0207097 A1 | 8/2009 | Sherman et al. |
| 2009/0210491 A1 | 8/2009 | Thakkar et al. |
| 2009/0286570 A1 | 11/2009 | Pierce |
| 2010/0003921 A1 | 1/2010 | Godlewski et al. |
| 2010/0041330 A1 | 2/2010 | Elg |
| 2010/0093401 A1 | 4/2010 | Moran et al. |
| 2010/0305729 A1 | 12/2010 | Glitsch et al. |
| 2011/0047247 A1 | 2/2011 | Katz et al. |
| 2011/0164105 A1 | 7/2011 | Lee et al. |
| 2011/0208807 A1 | 8/2011 | Shaffer |
| 2011/0280142 A1 | 11/2011 | Bychkov |
| 2012/0314777 A1 | 12/2012 | Zhang et al. |
| 2013/0258038 A1 | 10/2013 | Bychkov |
| 2015/0288922 A1 | 10/2015 | Bychkov et al. |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |
| WO | WO-2008011230 | 1/2008 |

OTHER PUBLICATIONS

"Final Office Action", U.S. Appl. No. 12/372,812, Feb. 10, 2015, 14 pages.

"Final Office Action", U.S. Appl. No. 12/372,812, Aug. 28, 2012, 14 pages.

"Final Office Action", U.S. Appl. No. 12/850,804, Jan. 10, 2013, 13 pages.

"Non-Final Office Action", U.S. Appl. No. 12/134,221, Nov. 15, 2011, 8 pages.

"Non-Final Ofice Action", U.S. Appl. No. 12/372,812, Jun. 13, 2014, 11 pages.

(56) References Cited

OTHER PUBLICATIONS

"Non-Final Office Action", U.S. Appl. No. 12/372,812, Dec. 22, 2011, 9 pages.
"Non-Final Office Action", U.S. Appl. No. 12/850,804, Oct. 26, 2012, 12 pages.
"Non-Final Office Action", U.S. Appl. No. 13/101,358, Jan. 9, 2013, 9 pages.
"Non-Final Office Action", U.S. Appl. No. 13/887,450, Jul. 8, 2015, 10 pages.
"Non-Final Office Action", U.S. Appl. No. 13/895,396, Nov. 20, 2014, 11 pages.
"Non-Final Office Action", U.S. Appl. No. 13/895,396, Dec. 16, 2014, 8 pages.
"Non-Final Office Action", U.S. Appl. No. 14/745,405, Oct. 21, 2015, 9 pages.
"Notice of Allowance", U.S. Appl. No. 12/850,804, Feb. 6, 2013, 12 pages.
"Notice of Allowance", U.S. Appl. No. 13/101,358, Feb. 19, 2013, 8 pages.
"Notice of Allowance", U.S. Appl. No. 13/895,396, Mar. 19, 2015, 10 pages.
"Restriction Requirement", U.S. Appl. No. 12/134,221, Aug. 2, 2011, 6 pages.
"Restriction Requirement", U.S. Appl. No. 12/372,812, Sep. 30, 2011, 9 pages.
"Restriction Requirement", U.S. Appl. No. 12/850,804, Oct. 3, 2012, 5 pages.
"Final Office Action", U.S. Appl. No. 13/887,450, Feb. 25, 2016, 10 pages.
"Final Office Action", U.S. Appl. No. 14/745,405, Apr. 1, 2016, 12 pages.
"Non-Final Office Action", U.S. Appl. No. 14/745,405, Aug. 5, 2016, 12 pages.
"Notice of Allowance", U.S. Appl. No. 12/372,812, Jun. 13, 2016, 5 pages.
"Non-Final Office Action", U.S. Appl. No. 13/887,450, Jan. 13, 2017, 11 pages.
"Final Office Action", U.S. Appl. No. 14/745,405, Jan. 27, 2017, 16 pages.
"Foreign Office Action", EP Application No. 11783165.1, Jan. 13, 2017, 5 pages.
"Notice of Allowance", U.S. Appl. No. 14/745,405, May 5, 2017, 5 pages.
"Supplementary European Search Report", EP Application No. 10809633.0, Apr. 24, 2017, 7 pages.

\* cited by examiner

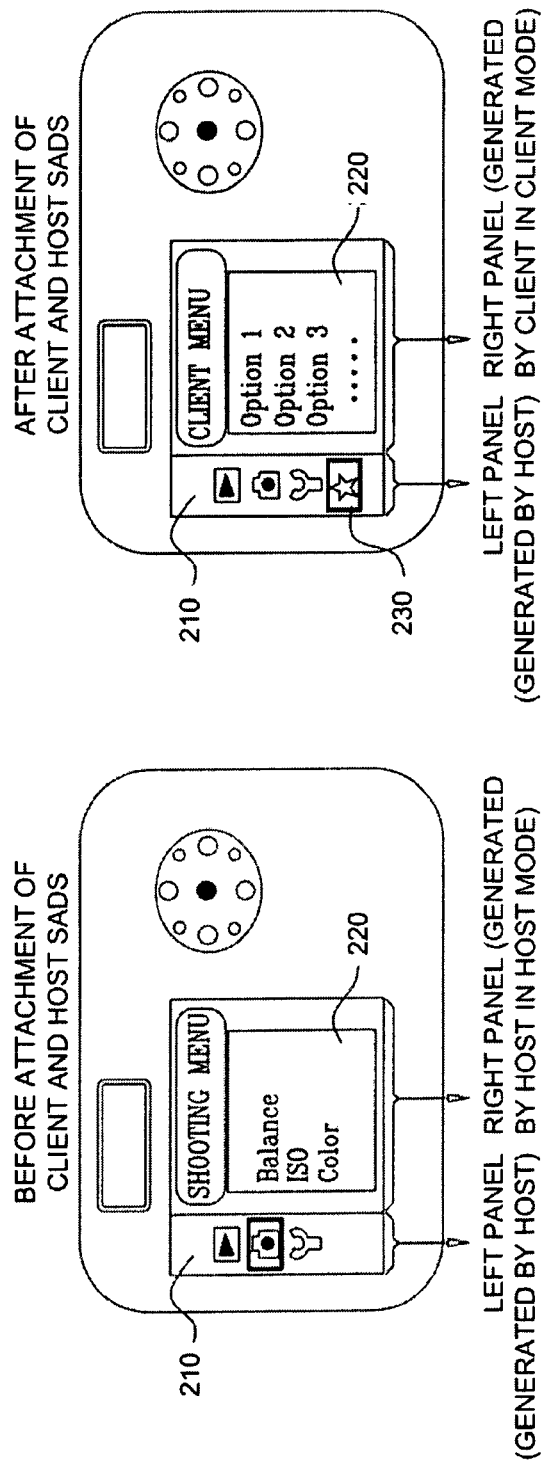

ADAPTIVE USER INTERFACE FOR MULTI-SOURCE SYSTEMS

PRIORITY REFERENCE TO RELATED APPLICATIONS

This application is a divisional of U.S. application Ser. No. 12/134,221, filed on Jun. 6, 2008 by inventors Itay Sherman, Eyal Bychkov, Yaron Segalov and Uriel R. Brison, which claims benefit of U.S. Provisional Application No. 60/933,780, entitled ADAPTIVE USER INTERFACE FOR MULTI-SOURCE SYSTEMS, filed on Jun. 8, 2007 by inventors Itay Sherman, Eyal Bychkov and Yaron Segalov.

FIELD OF THE INVENTION

The field of the present invention is electronic devices that are coupled together in a multi-source system.

BACKGROUND OF THE INVENTION

A standalone device (SAD) is generally fully operative by itself, and can be selectively configured by a user. The SAD may or may not have its own user interface for setting its configuration. When the SAD does not have its own user interface, an external host, such as a PC computer, is used to configure the SAD. Selection of a configuration generally affects functionality of the SAD, since different configurations correspond to different features.

For systems that include combinations of two or more inter-connected SADs, setting of their respective configurations is complicated. Such systems are common in consumer electronics and include inter alia, an MP3 player connected to a PC, a digital camera connected to a PC, a digital camera connected to a printer, and a router connected to a PC. Generally, when two SADs are inter-connected, either:
  i. each SAD is self-configured, and the two SADs merely exchange data; or
  ii. one of the SAD's is defined as a host and the other SAD is defined as a client.

Conventional client-host systems of inter-connected SADs use one of two methods for configuration; namely, a "driver method" and a "screen method".

The driver method is used in cases where a user runs an application that controls the client behavior from a PC host, such as an MP3 player connected to a PC computer. According to the driver method, the host SAD is loaded at the time of connecting the host with the client, or pre-loaded beforehand, with a software stack referred to as a "driver". The driver instructs the host how to send commands to the client. Drivers may be implemented at different software levels, from low level operating system (OS) drivers to application level drivers with user interfaces. A host SAD loaded with a driver is able to control the client SAD, and to configure operations of the client SAD using a communication channel between the host and the client.

Drivers are generally customized for specific operating systems, but are not customized for specific client device original equipment manufacturers (OEMs).

The screen method is used in cases where a user browses a configuration screen at a designated IP address, such as a router or a printer connected to a PC computer. According to the screen method, the host SAD displays a graphics screen that includes information transferred from the client SAD. The host itself is unaware of the content displayed on its screen to the user, or of the actions performed by the user. The screen method generally uses internal browsers that are installed in host SADs, and obviates the need for OEMs to develop their own dedicated OS drivers.

For a given client SAD, the same configuration screen is displayed for any host SAD connected therewith, since the screen corresponds to the client SAD, which not need be aware of the specific host that is being used to configure it.

Both the driver method and the screen method are client-specific and, as such, are unable to provide a uniform "look & feel" for a user. A look & feel refers to visual elements that are presented in a user interface, and include inter alia font, background color, menu design, position and shape of buttons and other controls, and arrangement of various options. As a result of this drawback, the user experiences different interfaces when he switches from a host configuration screen to a client configuration screen.

SUMMARY OF THE DESCRIPTION

Aspects of the present invention overcome drawbacks of conventional multi-source systems, and provide methods and systems for inter-connecting two or more SADs that communicate with one another, in such a way as to maintain a unified user interface look & feel. Using the present invention, a user experiences the same-looking interface when he switches from a host configuration screen to a client configuration screen. Both screens have the same look & feel, and a client SAD appears transparent to the user and does not appear as a foreign device.

Using the present invention, a client SAD is aware of the specific host SAD connected thereto, and adapts its screen graphics to the host's user interface. As such, the same user interface displays both host and client configurations and a unified look & feel is maintained.

The present invention is of particular advantage with multi-source systems where a client SAD is connected to one of multiple host SAD's. Methods of the present invention ensure that the user experiences a homogenous look & feel in each host SAD source, when he navigates from the host configuration screen to the client configuration screen.

Embodiments of the present invention provide methods and systems for on-line configuration of controlled software, which flexibly support a client connected to one of multiple hosts yet retain the same operational control over the client, and which adapt the look & feel so as to integrate the client control software in the host software environment in a homogeneous way. A host SAD is used to configure the multi-source system, and the host user interface is maintained as a fixed point of reference for the user. Adaptation to the host user interface is carried out in each client SAD.

The present invention is advantageous for a network of auxiliary display devices connected to a computer. The present invention introduces a bridge device that displays information on the bridge device screen according to the look & feel of auxiliary display devices connected thereto. As such, the present invention enhances the SideShow™ architecture of Microsoft, by enabling a bridge device to display a plurality of display device's information, and by enabling one display device to display another display device's information, with the look & feel of the other display device.

There is thus provided in accordance with an embodiment of the present invention a method for controlling configuration display screens within a client-host multi-source system, including transferring look & feel parameters from a host device to a client device, setting parameters of a configuration program for the client device, according to the look & feel parameters transferred by the transferring, generating, by the configuration program, a graphic image of a screen, the graphic image conforming to the look & feel parameters, and displaying the graphic image on a display screen of the host device.

There is further provided in accordance with an embodiment of the present invention a computer-readable storage medium storing program code for causing an electronic device to transfer look & feel parameters from a host device to a client device, to set parameters of a configuration program for the client device, according to the look & feel parameters that were transferred, to generate, by the configuration program, a graphic image of a screen, the graphic image conforming to the look & feel parameters, and to display the graphic image on a display screen of the host device.

There is yet further provided in accordance with an embodiment of the present invention a multi-source client-host system that maintains a uniform look & feel user interface, including a host device including a central processing unit, a storage memory for storing look & feel parameters for a graphical user interface, the graphical user interface employing a plurality of graphic images for user interaction, a display for displaying the graphic images employed by the graphical user interface, and a connector for transmitting the look & feel parameters to a client device, and for receiving at least one of the graphic images from the client device, when the client device is attached to the host device, a client device that can be attached to and detached from the host device, including a central processing unit, a configuration program for generating at least one of the graphic images employed by the graphical user interface, the at least one of the graphic images conforming to the look & feel parameters, and a connector, for transmitting the at least one of the graphical images to the host device, and for receiving the look & feel parameters from the host device, when the client device is attached to the host device, and a communication channel between the host transceiver and the client transceiver, for data transmission.

There is additionally provided in accordance with an embodiment of the present invention a method for controlling configuration display screens within a client-host multi-source system, including transferring look & feel parameters from a host device to a client device, setting parameters of a configuration program for the client device, according to the look & feel parameters transferred by the transferring, generating, by the configuration program, a web page located at a designated URL, the web page conforming to the look & feel parameters, and browsing the designated URL, by a web browser in the host device.

There is moreover provided in accordance with an embodiment of the present invention a computer-readable storage medium storing program code for causing an electronic device to transfer look & feel parameters from a host device to a client device, to set parameters of a configuration program for the client device, according to the look & feel parameters that were transferred, to generate, by the configuration program, a web page located at a designated URL, the web page conforming to the look & feel parameters, and to browse the designated URL, by a web browser in the host device.

There is further provided in accordance with an embodiment of the present invention a multi-source client-host system that maintains a uniform look & feel user interface, including a host device including a central processing unit, a storage memory for storing look & feel parameters for a graphical user interface, the graphical user interface employing a plurality of web pages for user interaction, a web browser for browsing and rendering the web pages employed by the graphical user interface, and a connector for transmitting the look & feel parameters to a client device, when the client device is attached to the host device, a client device that can be attached to and detached from the host device, including a central processing unit, a configuration program for generating at least one of the web pages employed by the graphical user interface, the at least one of the web pages conforming to the look & feel parameters, and a connector for receiving the look & feel parameters from the host device, when the client device is attached to the host device, and a communication channel between the host transmitter and the client receiver, for data transmission.

There is yet further provided in accordance with an embodiment of the present invention a method for controlling configuration display screens within a client-host multi-source system, including transferring a client configuration program from a client device to a host device, setting parameters of the transferred client configuration program according to look & feel parameters of the host device, generating, by the host device via the client configuration program, a graphic image of a client configuration screen, the graphic image conforming to the host look & feel parameters, and displaying the graphic image on a display screen of the host device.

There is additionally provided in accordance with an embodiment of the present invention a computer-readable storage medium storing program code for causing an electronic device to transfer a client configuration program from a client device to a host device, to set parameters of the transferred client configuration program according to look & feel parameters of the host device, to generate, by the host device via the client configuration program, a graphic image of a client configuration screen, the graphic image conforming to the host look & feel parameters, and to display the graphic image on a display screen of the host device.

There is further provided in accordance with an embodiment of the present invention an electronic device with extended application functionality, including circuitry for device hardware, for accessing and controlling hardware functions, circuitry for at least one application, a connector for coupling with another hardware device, the other device having circuitry for device hardware, for accessing and controlling hardware functions, and a coupled device control module for enabling the at least one application to identify, access and control the hardware functions on the other device, when the other device is connected to the connector.

There is yet further provided in accordance with an embodiment of the present invention a bridge system for auxiliary display devices connected to a computer, including a computer running a plurality of mini-programs, each mini-program sending information of a specific nature from the computer to a corresponding auxiliary display device, for presentation to a user, a plurality of auxiliary display devices, each auxiliary display device including an auxiliary screen and each auxiliary display device having look & feel display parameters, for receiving information from the corresponding plurality of mini-programs, and for displaying the received information on said auxiliary screens according to the corresponding look & feel parameters, and at least one bridge device coupled to the computer, each bridge device coupled to at least one of the auxiliary display devices, each bridge device including a bridge screen, and each bridge device receiving information from a corresponding at least one of the mini-programs, forwarding the received information to the at least one of the auxiliary display devices, and displaying the received information on the bridge screen according to the look & feel display parameters of the at least one of the auxiliary display devices.

There is moreover provided in accordance with an embodiment of the present invention a method for managing auxiliary display devices connected to a computer, including receiving XML information of a specific nature from a mini-program running on a computer, and receiving look & feel parameters from an auxiliary display device that displays information in a display format conforming to the look & feel parameters, for presentation to a user, transforming the XML information to a BMP image conforming to the look & feel parameters of the auxiliary display device, transmitting the BMP image to the auxiliary display device for presentation to the user, receiving an indication of an action performed by the user on the auxiliary display device in response to viewing the BMP image, generating a second BMP image based on the received indication, conforming to the look & feel parameters of the auxiliary display device, and further transmitting the second BMP image to the auxiliary display device for further presentation to the user.

There is additionally provided in accordance with an embodiment of the present invention a method for managing auxiliary display devices connected to a computer, including receiving XML information of a specific nature from a mini-program running on a computer, and receiving look & feel parameters from an auxiliary display device that displays information in a display format conforming to the look & feel parameters, for presentation to a user, transforming the XML information to a BMP image conforming to the look & feel parameters of the auxiliary display device, transmitting the BMP image to the auxiliary display device for presentation to the user, receiving additional XML information from the mini-program, generating a second BMP image based on the additional XML information, conforming to the look & feel parameters of the auxiliary display device, and further transmitting the second BMP image to the auxiliary display device for further presentation to the user.

BRIEF DESCRIPTION OF THE DRAWINGS

The present invention will be more fully understood and appreciated from the following detailed description, taken in conjunction with the drawings in which:

FIGS. 1A and 1B, FIGS. 2A and 2B, and FIGS. 3A and 3B are displays of various configuration screens for a host SAD and a client SAD connected together within a multi-source system, wherein the host and client screens are controlled so as to have the same look & feel, in accordance with an embodiment of the present invention;

DETAILED DESCRIPTION

Aspects of the present invention relate to multi-source systems with inter-connected standalone devices (SADs), where one of the SADs serves as a host device, and is used to configure itself and to configure the client devices in the system. Using embodiments of the present invention, the client devices adapt the look & feel of their configuration screens so as to conform to the look & feel of the host configuration screen. The host interface look & feel thereby serves as a fixed and familiar point of reference for a user of the multi-source system.

The look & feel of an interface relates to visual elements that a user experiences when he interacts with the interface. The look & feel includes inter alia:
screen size (pixel width and height);
font type, font size, font color and other visual font characteristics;
background color and background pattern (e.g., BMP or JPG image, or multiple images for animation);
menu type (e.g., scroll with items selected marked by highlight or zoom);
transitional entry effects (e.g., flip, zoom);
screen and button topology (e.g., location of specific buttons on the screen, such as the X button at the top-right corner of a window for closing the window);
menu topology (e.g., location of items in a specific menu); and
screen template (e.g., usage and position of general progress keys, such as Next, Back, Cancel and Enter).

In accordance with an embodiment of the present invention, look & feel parameters may be defined in an XML document. Such an XML document may, for example, take the form provided below.

Sample XML document with look & feel parameters

```
<definitions>
    <screen>
        <size=800*600>
        <touch=yes>
        <layout=portrait>
        <color quality=32 bit>
        .....
    </screen>
    <background>
        <color = black>
        <pattern = none>
        .....
    </background>
    <fonts>
```

-continued

Sample XML document with look & feel parameters

```
<font1>
    <color=yellow>
    <size=16>
    <type=bold italic>
    ......
</font1>
<font2>
    <color=blue>
    <size=12>
    <type=regular>
    ......
</font2>
...
</fonts>
...
<buttons>
    <button1>
        <location=bottom left>
        <icon="left_arrow.jpg">
    </button1>
    <button2>
        <location=bottom right>
        <icon="right_arrow.jpg">
    </button2>
</buttons>
...
</definitions>
```

Figure 1A:
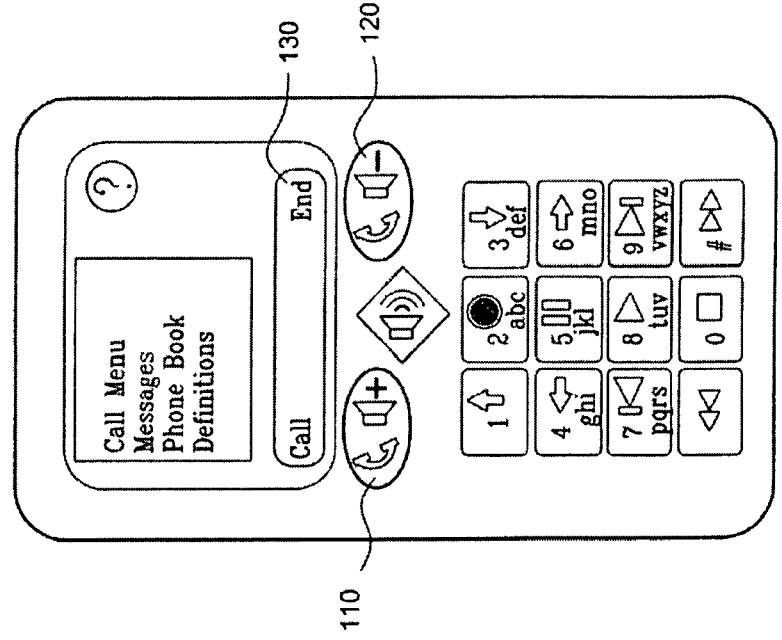
Figure 1B:
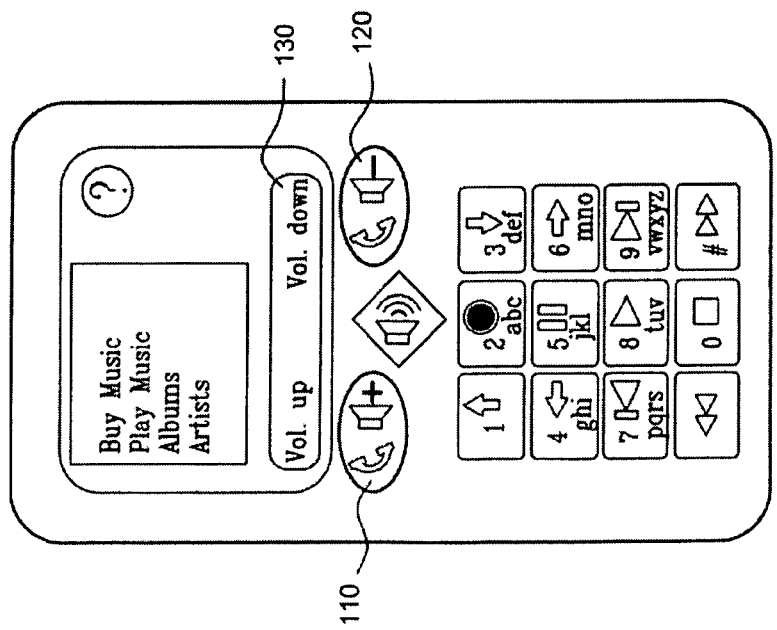

Reference is now made to FIGS. 1A and 1B, FIGS. 2A and 2B, and FIGS. 3A and 3B, which are displays of various configuration screens for a host SAD and a client SAD connected together within a multi-source system, wherein the host and client screens are controlled so as to have the same look & feel, in accordance with an embodiment of the present invention. The host shown in FIG. 1A is a media player, such as an MP3 player, and the client shown in FIG. 1B is a cell phone. Shown in FIG. 1A is a sample interface for the host. The screen shown in FIG. 1A corresponds to the host configuration screen, before the client is connected to the host, and the screen shown in FIG. 1B corresponds to the client configuration screen, after the client is connected to the host. It is noted that both screens have the same look & feel. Specifically, when the client SAD is attached to the host SAD, the font size, type and color remain the same, and the screen size and background color remain the same.

In addition, the screen template is preserved for two "soft-keys" 110 and 120 and a bar 130 above them that includes their corresponding function names. Soft keys are multi-function keys that use part of a display to identify their function at any moment. Soft-keys are generally located directly below the display. In FIG. 1A soft keys 110 and 120 correspond respectively to Vol. Up and Vol. Down functions, as indicated by bar 130; and in FIG. 1B soft keys 110 and 120 correspond respectively to Call and End functions, respectively, as indicated by bar 130.

The host shown in FIG. 2A is a digital camera, and the client shown in FIG. 2B is another electronic device. Shown in FIG. 2A is a sample interface for the host. Again, in accordance with the present invention, the look & feel of FIG. 2B (client configuration) is the same as that of FIG. 2A (host configuration). As may be seen in FIGS. 2A and 2B, the look & feel of the configuration interface includes a left panel 210 and a right panel 220. The left panel 210 is created by the host. When the client is attached to the host, the left panel may be altered by the host. Thus in FIG. 2B the left panel includes a control element 230 in the shape of a star, for toggling between host mode and client mode.

The right panel 220 is controlled by the host when the host mode is running, and controlled by the client when the client mode is running. In either case, the content displayed in the right panel conforms to the look & feel parameters for the host. The "look" parameters of the right panel, including inter alia the dimensions of the right panel, its background color, its font type, size and color, and its menu header and location, are the same in FIGS. 2A and 2B. Similarly, the "feel" parameters of the right panel, including inter alia assignment of client options 1, 2 and 3 to corresponding host buttons and the jog dial options, are also the same in FIGS. 2A and 2B.

Figure 3B:
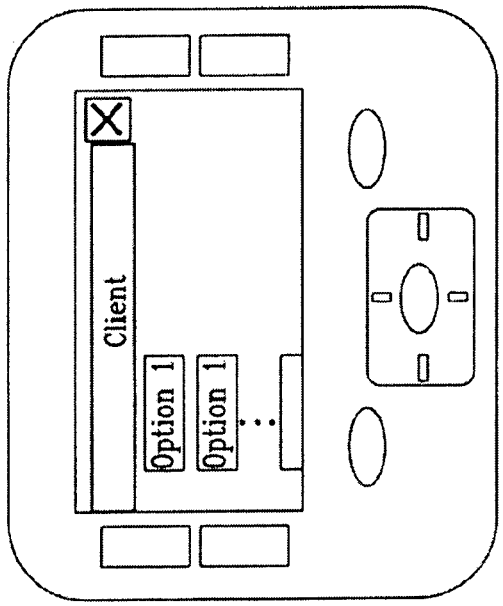
Figure 3A:
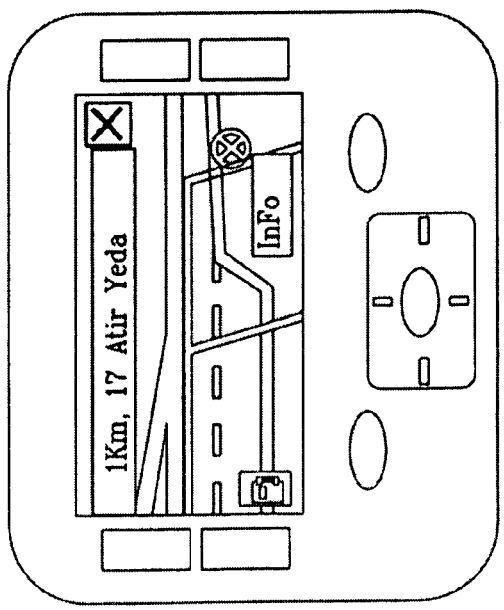

The host shown in FIG. 3A is a GPS navigator, and the client shown in FIG. 3B is another electronic device. Shown in FIG. 3A is a sample interface for the host. Again, in accordance with the present invention, the look & feel of FIG. 3B (client configuration) is the same as that of FIG. 3A (host configuration). For example, it is noted that the "X" remains in the top right corner when the client is attached to the host.

Figure 4:
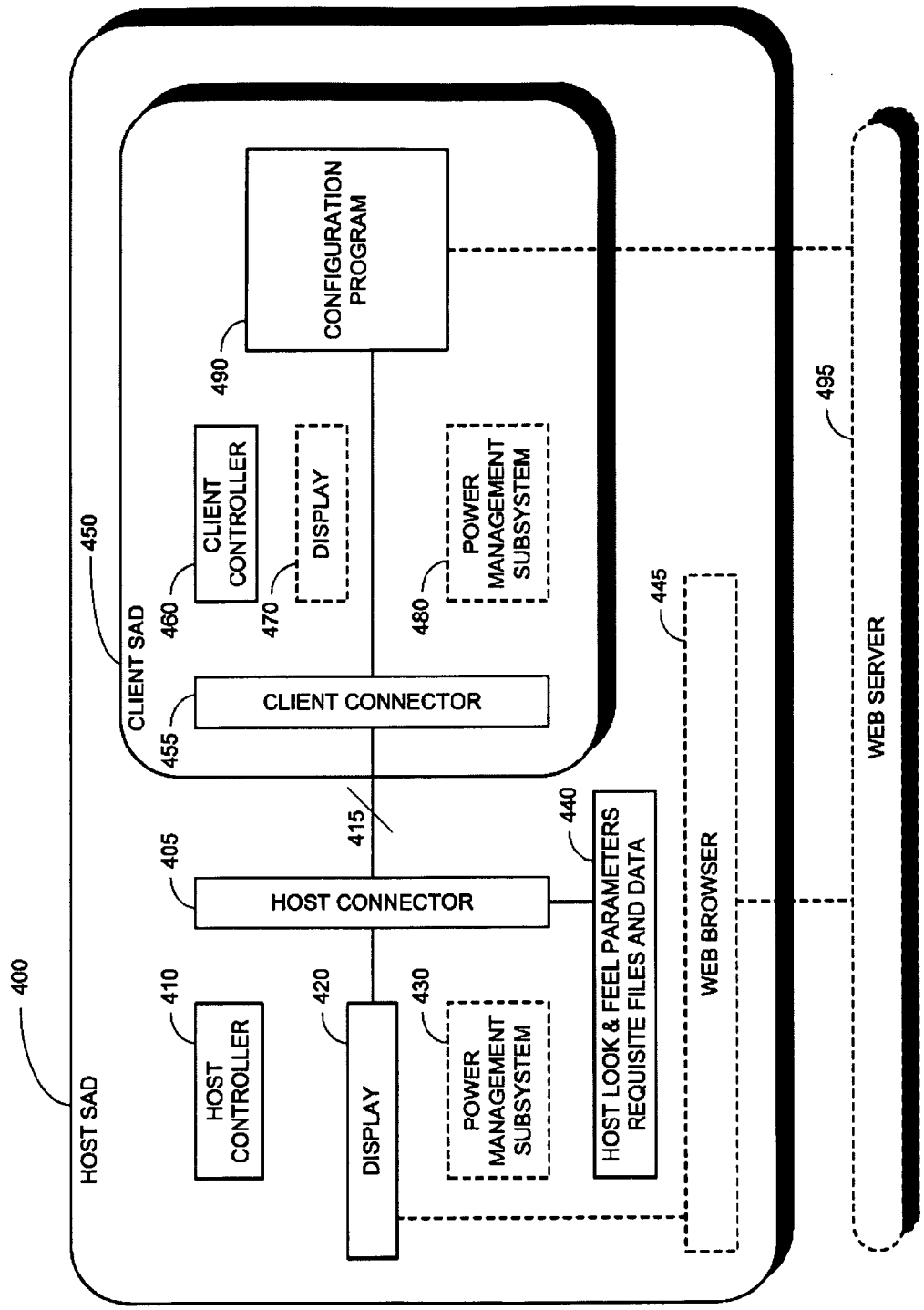
FIG. 4 is a simplified block diagram of a multi-source system with a uniform interface for configuring a host and a client, in accordance with an embodiment of the present invention.

More generally, reference is now made to FIG. 4, which is a simplified block diagram of a multi-source system with a uniform interface for configuring a host and a client, in accordance with an embodiment of the present invention. Shown in FIG. 4 is a host SAD 400, which includes a controller 410, a display 420 and an optional power management subsystem 430. Host SAD 400 has its own look & feel parameters 440 stored therein. In accordance with an embodiment of the present invention, some or all of the following files and data are stored with look & feel parameters 440:

font files—including inter alia information about supported fonts;
text strings—including inter alia text displayed for the soft keys;
resources—including inter alia bitmaps and ring tones;
layouts—including inter alia buttons and appearance of screens;
settings—including inter alia wallpaper, ringtones, default "look & Feel" and browsing effects;
key mappings—mappings of all valid key-presses, including mappings of key-press combinations, so that a key press, a shift-key press and a control-key press are assigned different codes; e.g., "A", "a", Shift+"A", Ctrl+"A" are assigned different codes;
audio settings—including inter alia available devices (speaker, microphone), and maximum volume per device;
display—screen size (width, height), driver and orientation; and
backlight—which LEDs to light up for the keyboard and which LEDs to light up for the display, and light intensity.

Also shown in FIG. 4 is a client SAD 450. Client SAD includes a controller 460, an optional display 470 and an optional power management subsystem 480. Client SAD also includes a configuration program 490, which enables a user to select configuration settings for client SAD 450.

Host SAD 400 and client SAD 450 communicate via respective connectors 405 and 455 over a communication channel 415. Communication channel 415 may be a physical or a wireless channel. Host look & feel parameters 440 are transmitted by connector 405 over communication channel 415, and received by connector 455. In turn, the look & feel parameters are transmitted to configuration program 490.

Configuration program 490 has a default screen look & feel. In accordance with an embodiment of the present invention, configuration program 490 adapts its look & feel accordingly, so as to conform to look & feel parameters 440 of host SAD 400. Configuration program 490 generates a graphics screen image that conforms to look & feel parameters 440. The graphics screen image is transmitted to connector 455, which transmits it further to connector 405 over communication channel 415. The graphics image is then transmitted to host display 420, for display to a user.

As the user interacts with the displayed graphics image and issues successive commands, the commands are transmitted via communication channel 415 back to configuration program 490, which generates successive graphics screen images in response to the user commands. The successive graphics screen images, based again on look & feel parameters 440, are transmitted to display 420 for further display to the user.

Figure 5A:
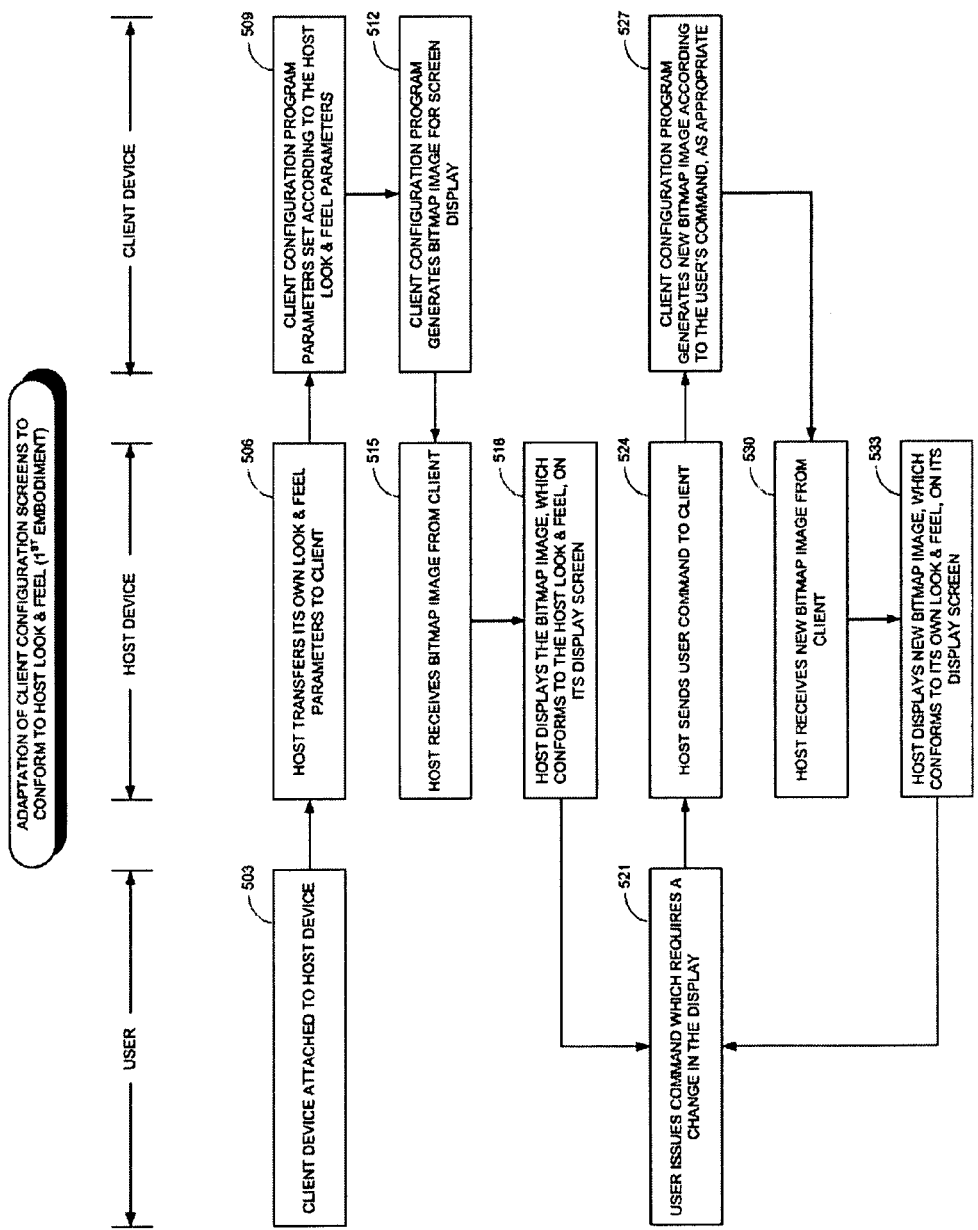
FIGS. 5A, 5B and 5C are simplified flowcharts of three embodiments of a method for controlling a configuration interface for a client SAD so as to conform to the look & feel of a configuration interface for a host SAD, in accordance with an embodiment of the present invention.

Reference is now made to FIG. 5A, which is a simplified flowchart of a first embodiment of a method for controlling a configuration interface for a client SAD so as to conform to the look & feel of a configuration interface for a host SAD, in accordance with an embodiment of the present invention. The flowchart of FIG. 5A is divided into three columns. The leftmost column indicates steps performed by a user who is operating a multi-source system including the host SAD and the client SAD. The middle column indicates steps performed by the host SAD, and the rightmost column indicates steps performed by the client SAD.

At step 503 the client device is attached to the host device. At step 506 the host transfers its own look & feel parameters to the client. As described hereinabove, the host look & feel parameters may be specified in an XML document. The host may also transfer requisite font files, for fonts specified in the look & feel parameters.

At step 509 the client adapts the look & feel of its configuration program according to the host look & feel parameters. At step 512 the client configuration program generates a configuration screen, in the form of a bitmap image, that conforms to the look & feel of the host configuration screen.

At step 515 the host receives the bitmap image of the configuration screen from the client, and at step 518 the host displays the bitmap image, which conforms to the host look & feel. As such, the user interface displayed by the host preserves a unified look & feel, even when being used to configure the client.

It may thus be appreciated that the host displays its own configuration options and the client configuration options on the same screen, and with a common look & feel. The host may display both configurations at the same time, or may switch between host options and client options, but in each case the same visual user interface is presented to the user.

At step 521 the user interacts with the system and performs an action, the response to which may require a change in the display screen. At step 524 the host sends the client a notification of the user action. The notification sent by the client is generally an indication of a key press by the user. For example, the host may have a 4×4 keypad matrix, and sends the client a notification of which of the 16 keys was pressed by the user.

At step 527 the client configuration program translates the user action notification into a command, based on an appropriate key assignment table, and generates a new bitmap image for a configuration screen, in response to the command, as appropriate. At step 530 the host receives the new configuration screen, in the form of the new bitmap image, from the client. Finally, at step 533 the host displays the altered screen, which again conforms to the look & feel of the host. The method then returns to step 521, as the user continues to interact with the system.

Figure 5B:
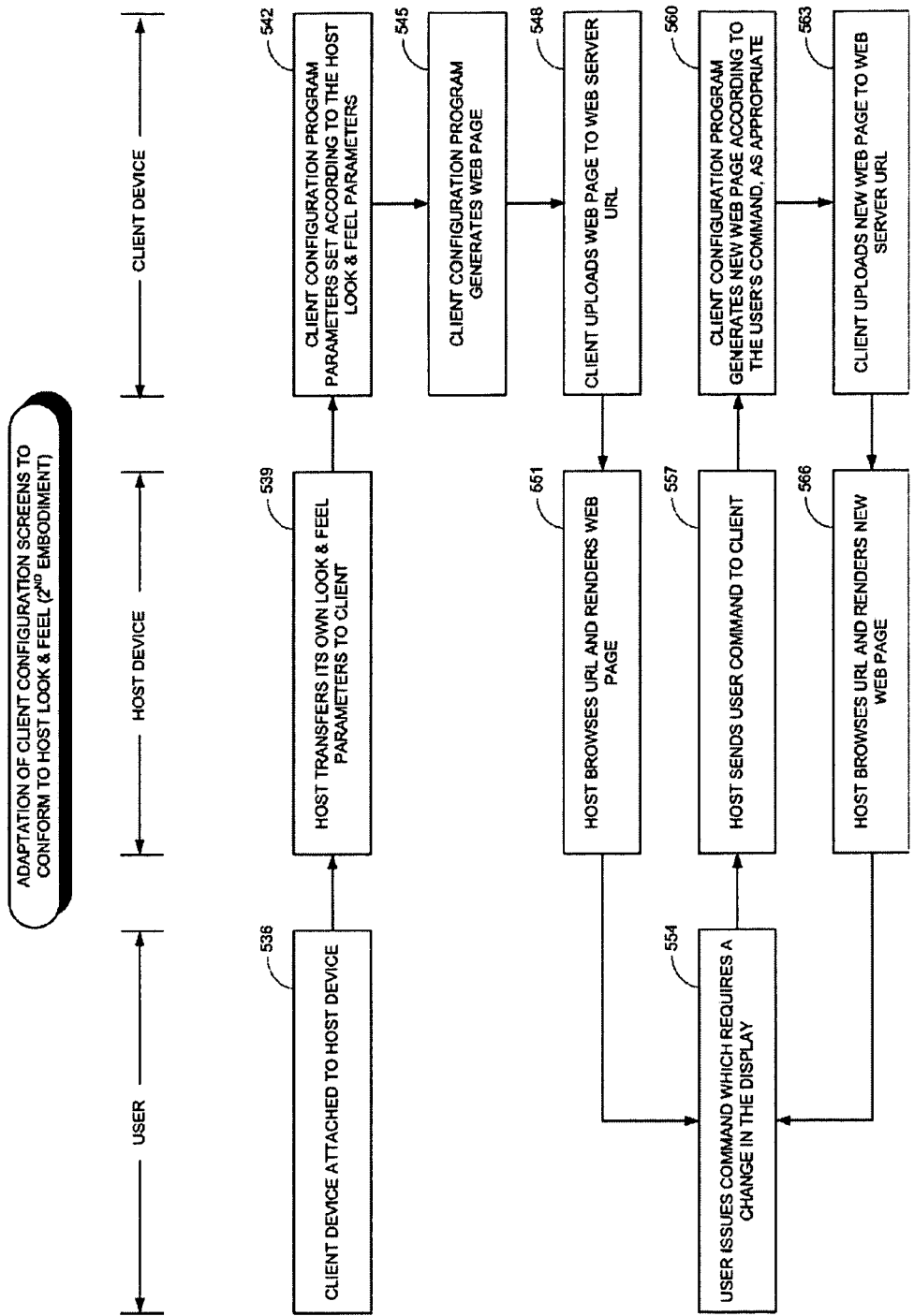

Reference is now made to FIG. 5B, which is a simplified flowchart of a second embodiment of a method for controlling a configuration interface for a client SAD so as to conform to the look & feel of a configuration interface for a host SAD, in accordance with an embodiment of the present invention. The flowchart of FIG. 5B is divided into three columns. The leftmost column indicates steps performed by a user who is operating a multi-source system including the host SAD and the client SAD. The middle column indicates steps performed by the host SAD, and the rightmost column indicates steps performed by the client SAD. The method of FIG. 5B uses a web interface for a user to configure the client device.

At step 536 the client device is attached to the host device. At step 539 the host device transfers its look & feel parameters to the client device. The host may also transfer requisite font files, for fonts specified in the look & feel parameters. At step 542 the client configuration program sets its parameters according to the host look & feel parameters.

At step 545 the client configuration program generates a web page, which conforms to the host look & feel parameters. At step 548 the client device uploads the web page to a URL on a web server. At step 551 the host, using a web browser installed therein, browses the URL and renders and displays the web page.

Referring back to FIG. 4, in this second embodiment host device 400 includes a web browser 445, which browses and renders web pages stored in a web server 495. The web pages are generated by configuration program 490 so as to comply with host look & feel parameters 440, and are uploaded to web server 495.

Proceeding now with FIG. 5, at step 554 a user who is viewing the web page displayed at step 551 performs an action. At step 557 the host sends a notification of the user action to the client. At step 560 the client translates the user action into a command, and the client configuration program generates a new web page, in response to the command, as appropriate. At step 563 the client uploads the web page to a URL on the web server. At step 566 the host browses the URL and renders and displays the new web page. The method then returns to step 554, as the user continues to interact with the system.

Figure 5C:
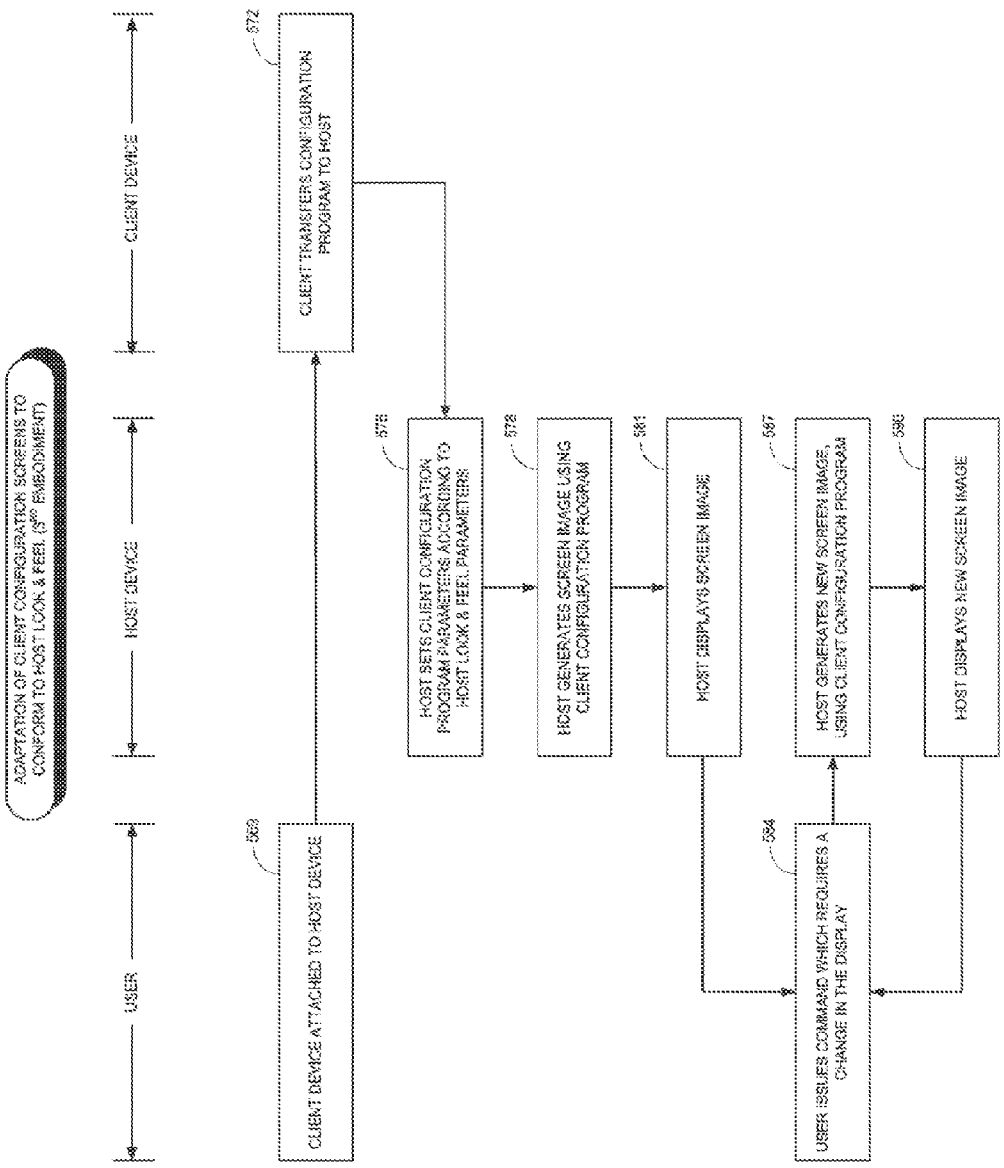

Reference is now made to FIG. 5C, which is a simplified flowchart of a third embodiment of a method for controlling a configuration interface for a client SAD so as to conform to the look & feel of a configuration interface for a host SAD, in accordance with an embodiment of the present invention. The flowchart of FIG. 5C is divided into three columns. The leftmost column indicates steps performed by a user who is operating a multi-source system including the host SAD and the client SAD. The middle column indicates steps performed by the host SAD, and the rightmost column indicates steps performed by the client SAD.

At step 569 the client device is attached to the host device. At step 572 the client transfers its configuration program to the host, thus enabling the host to generate the appropriate user interfaces.

At step 575 the host sets parameters of the client's configuration program corresponding to the host look & feel parameters. At step 578 the host by itself generates a screen image for client configuration, running the client's configuration program. At step 581 the host displays the screen image.

At step 584 a user who is viewing and interacting with the user interface issues a command. At step 587 the host generates a new screen image, in response to the user command, as appropriate, running the client's configuration program. At step 590 the host displays the new screen image. The method then returns to step 584, as the user continues to interact with the system.

It will thus be appreciated by those skilled in the art that the methods of FIGS. 5A, 5B and 5C enable a host SAD in a multi-source system to display both host configuration settings and client configuration settings on the host screen, simultaneously, with a uniform look & feel. As such, a user of the system experiences a homogeneous interface, and it is transparent to the user that two different SADs are operating.

Implementation Details

Generally, key assignments are provided for each host mode of a host device, and for each client mode of a client device. A device may have multiple modes; e.g., a cell phone may have a dialer mode and a messaging mode. Shown in TABLES IA and IB are example button key assignments for a host mode and a client mode, respectively, within a multi-source system. TABLES IA and IB correspond to FIGS. 1A and 1B, respectively, where the host is an MP3 player running in media player mode, and the client is a cell phone running in dialer mode. The buttons of the system are labeled B1-B15, together with a TOUCH button on the touch screen displayed with a question mark. The buttons have one assignment of functions in host mode and another assignment of functions in client mode. Button B8, for example, is assigned a play function in TABLE IA, and is assigned a function to enter the numeral "8" in TABLE IB.

Figure 6:
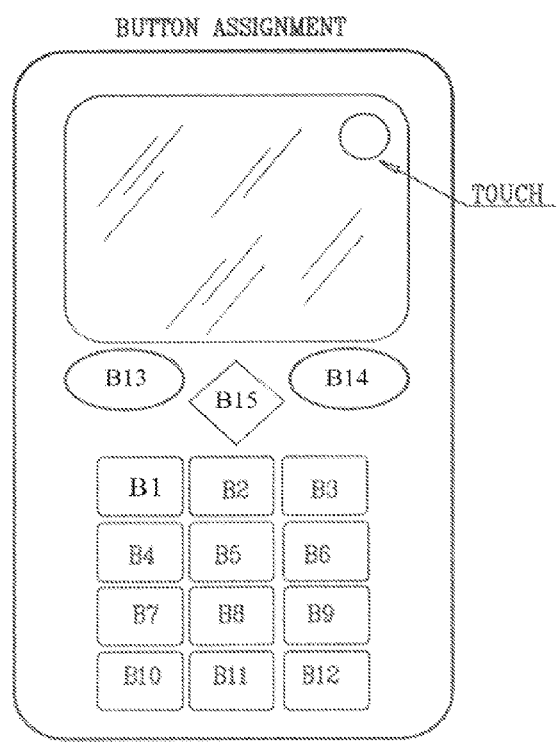
FIG. 6 is an illustration of button keys for a multi-source system that have different key assignments for host mode and client mode, but a common look & feel user interface for setting host and client configuration parameters, in accordance with an embodiment of the present invention.

Reference is now made to FIG. 6, which is an illustration of button keys for a multi-source system that have different key assignments for host mode and client mode, but a common look & feel user interface for setting host and client configuration parameters, in accordance with an embodiment of the present invention. As shown in FIG. 6, buttons B1-B12 correspond to the four rows of three buttons on the keypad, in the order from top left to bottom right. Buttons B13 and B14 correspond to the soft keys 110 and 120 in FIGS. 1A and 1B. Button B15 corresponds to the speaker button.

It is also noted that buttons B4, B6, B13 and B14 have dual functions, corresponding to a short duration press and a long duration press. Key-press and key-release events may be analyzed so as to distinguish between long duration and short duration presses.

When running in host mode, the key assignments correspond to media player key assignments, as in TABLE IA. However, when running in client mode, the key assignments correspond to conventional cell phone key assignments, as in TABLE IB. It may be seen from TABLE IA that in host mode, buttons B5 and B15 are not used, and long button presses are not distinguished from short presses.

TABLE IA

Media Player Key Assignments

| Screen | Function | Assigned Key |
|---|---|---|
| Media Player Mode | Play | B8 |
| | Stop | B11 |
| | Next | B9 |
| | Prev | B7 |
| | FWD | B12 |
| | BKD | B10 |
| | Record | B2 |
| | Vol. Up | B13 |
| | Vol. Down | B14 |
| | Up | B1 |

TABLE IA-continued

Media Player Key Assignments

| Screen | Function | Assigned Key |
|---|---|---|
| | Down | B3 |
| | Right | B6 |
| | Left | B4 |
| | Help | TOUCH |

TABLE IB

Dialer Key Assignments

| Screen | Function | Assigned Key |
|---|---|---|
| Dialer Mode | 0 | B11 |
| | 1 | B1 |
| | 2 | B2 |
| | 3 | B3 |
| | 4 | B4 |
| | 5 | B5 |
| | 6 | B6 |
| | 7 | B7 |
| | 8 | B8 |
| | 9 | B9 |
| | # | B12 |
| | * | B10 |
| | Left | LONG B4 |
| | Right | LONG B6 |
| | Call | B13 |
| | End | B14 |
| | Erase | LONG B14 |
| | Options | LONG B13 |
| | Speaker | B15 |
| | Help | TOUCH |

In accordance with the present invention, when the client device is not attached to the host device, or when the client device is attached to the host device but the multi-source system is running in host mode, the host key assignments, such as those indicated in TABLE IA, are used. Switching between host mode and client mode may be performed, for example, using a toggle switch such as control element 230 in FIG. 2B. When the client device is attached to the host device, the client sends the host a list of user functions it supports, such as the various functions indicated in TABLE IB. The host then assigns the functions to buttons, and sends the client the key assignments.

When the client is attached to the host and the multi-source system is running in client mode, the graphic image displayed on the host screen, or a portion of the graphic image that is assigned to the client, is generated by the client and transmitted to the host for display. When the user presses a button, the button press event is sent to the client, and translated by the client according to the key assignment for that button. If the user presses a touch screen, then the X-Y coordinates of the press location are send to the client. In response, the client generates a new graphic image, conforming to the look & feel parameters that the client received from the host. The new graphic image is transmitted to the host for display, thus completing a cycle of user input and screen display in response to the input. Generally, several such cycles are performed in an interactive session.

When the key assignments distinguish between short and long duration presses, as in TABLE IB, the host may do the analysis to make the distinction and pass the result (long press or short press) to the client. In an alternative embodiment, the host may send the key-press and key-release events to the client, and the client then determines the type of press (long or short) from these events.

Figure 7:
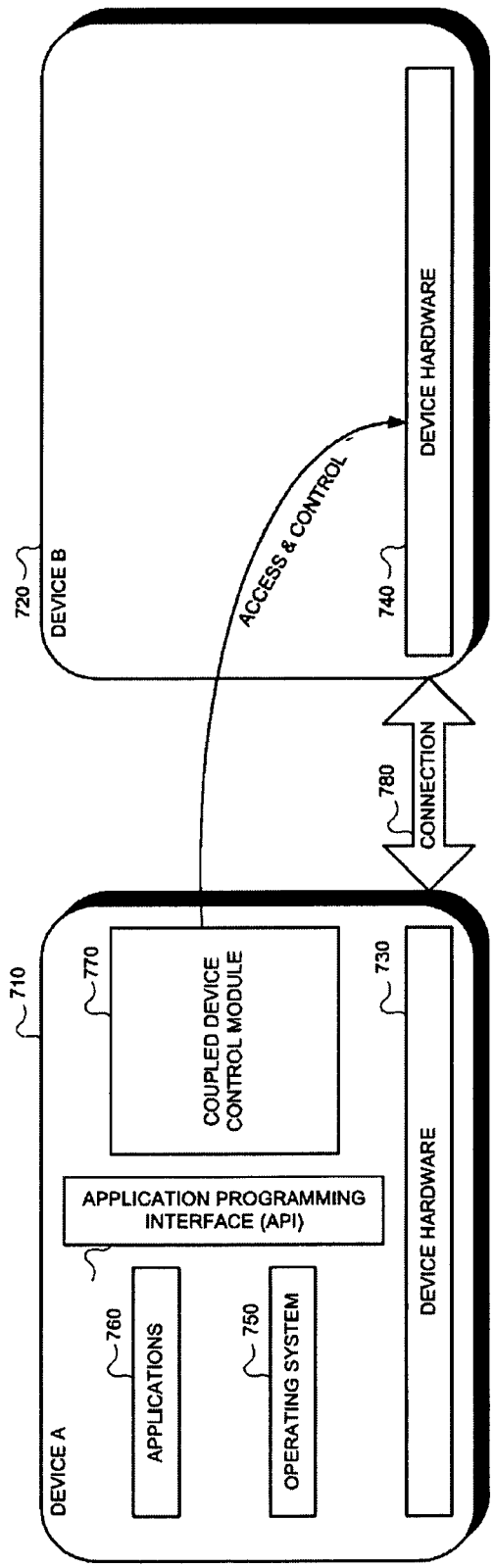
FIG. 7 is a simplified block diagram of a system for extending application functionality in modular and coupled hardware devices, in accordance with an embodiment of the present invention.

Embodiments of the present invention relate to general methods and systems for enabling a first electronic device, such as client SAD 450 (FIG. 4), to identify, access and control functions of a second electronic device, such as host SAD 400, that is coupled with the first electronic device. In this regard reference is now made to FIG. 7, which is a simplified block diagram of a system for extending application functionality in modular and coupled hardware devices, in accordance with an embodiment of the present invention. Shown in FIG. 7 are two devices 710 and 720, labeled respectively as Device A and Device B. Each device is an electronic device having device hardware 730 and 740, respectively, that performs various hardware functions. In addition, Device A includes an operating system 750, one or more applications 760 and a coupled device control module (CDCM) 770. Device A and Device B are coupled by a physical connector 780.

CDCM 770 is used as a programming layer that allows applications 760 on Device A to access information and functionality of hardware 740 on Device B and to thereby control Device B's functionality and data. For example, Device A may be a mobile phone and Device B may be a media player. CDCM 770 enables applications on the mobile phone to identify and control hardware features of the media player.

In one embodiment of the present invention, CDCM 770 is implemented as a software module extension to a virtual machine (VM). For example, CDCM 770 may be implemented as a Java VM functionality extension set, which can be described in a Java Specification Request (JSR). CDCM 770 is implemented as an application programming interface (API) extension to the VM, which is exposed to applications 760, and which allows applications 760 to identify, access and control hardware and software functions on Device B. Such API enables identification of device hardware 740, and facilitates data exchange between applications and hardware and software components, irrespective of their locations on Device A and Device B.

In another embodiment of the present invention, CDCM 770 is implemented as an extension to operating system 750. In yet another embodiment of the present invention, CDCM 770 is implemented as a standalone module.

It will thus be appreciated by those skilled in the art that embodiments of the present invention in a broad sense enable a first electronic device to access and control a second electronic device coupled therewith, and to automatically adapt its user interface to be compatible with that of the second device.

Bridges for Connecting Auxiliary Displays to a Computer

Figure 8:
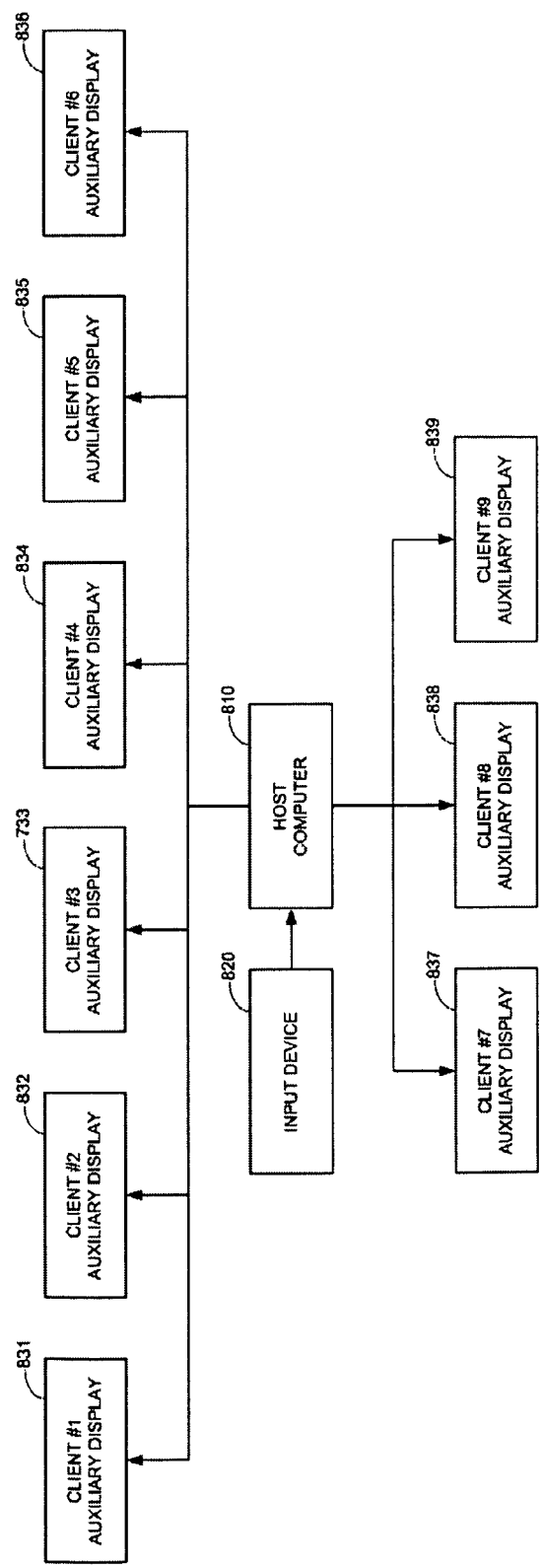
FIG. 8 is a prior art block diagram of auxiliary display devices connected to a computer.

The present invention applies to a network of auxiliary display devices connected to a PC computer. In this regard, reference is now made to FIG. 8, which is a prior art block diagram of auxiliary display devices connected to a computer. Shown in FIG. 8 is a computer 810 with an input device 820 such as a keyboard or mouse. Computer 810 is connected to multiple auxiliary display devices 831-839. Each auxiliary display device is used to display information stored on computer 810, such as e-mail messages, calendar reminders, or such other notifications. Auxiliary display devices 831-839 include inter alia mobile phones, GPS navigators, remote controls with built-in screens, keyboards with built-in screens, wearable display devices, music players, digital picture frames, game stations, home entertainment systems, and such other consumer electronic (CE) devices.

An auxiliary display device may be embedded within computer 810, such as an in-lid attached laptop display. An auxiliary display device may be a separate peripheral device connected to computer 810 by a wired or wireless connection, including inter alia USB, Bluetooth, TCP/IP or other such data communication protocols, existing now or to be developed in the future. An auxiliary display device may also be a designated area within a main screen of computer 810.

Microsoft Corporation of Redmond, Wash., recently introduced its SideShow™ technology into Windows Vista®, which enables developers to write mini-applications on computer 810 that send appropriate data from computer 810 to auxiliary display devices 831-839, as required by the display devices. These mini-applications, referred to as "gadgets", communicate with Windows SideShow application programming interfaces (APIs), and are independent of the software layers below them. Examples of such gadgets include (i) a calendar gadget that periodically retrieves data from a calendar application such as Microsoft Outlook®, and sends the data to an auxiliary display device, (ii) a weather gadget that retrieves data from a web service and updates an auxiliary display device with weather information in designated locales, and (iii) an instant messaging gadget that provides presence information regarding a user's buddies on an auxiliary display device.

Microsoft SideShow requires that auxiliary display devices 831-839 be able to interpret the Simple Content Format (SCF) and, optionally the iCalendar data format. SCF defines a set of XML elements and attributes that allow content, dialog and menu pages to be sent to auxiliary devices 831-839. In addition, SCF enables extended custom content types to be defined.

Auxiliary display devices 831-839 may be powered even when computer 810 is in a low-power mode such as standby mode or hibernate mode.

Auxiliary display devices 831-839 behave as client devices, which receive their data from their corresponding gadgets running on computer 810, which behaves as a host. This is indicated in FIG. 8 by referring to display devices 831-839 as client #1-client #9, respectively, and by referring to computer 810 as host computer. The designation of a device as host or client in FIG. 8 relates to the display of information. A host device sends display information to a client device, which the client device displays on its screen. Display devices 831-839 do not manipulate data that they display, and such data remains within the auxiliary display devices and is not transmitted elsewhere. Moreover, if an auxiliary display device has an internal application, then such application is not shared with other devices. As such, display devices 831-839 are dumb terminals.

Figure 9:
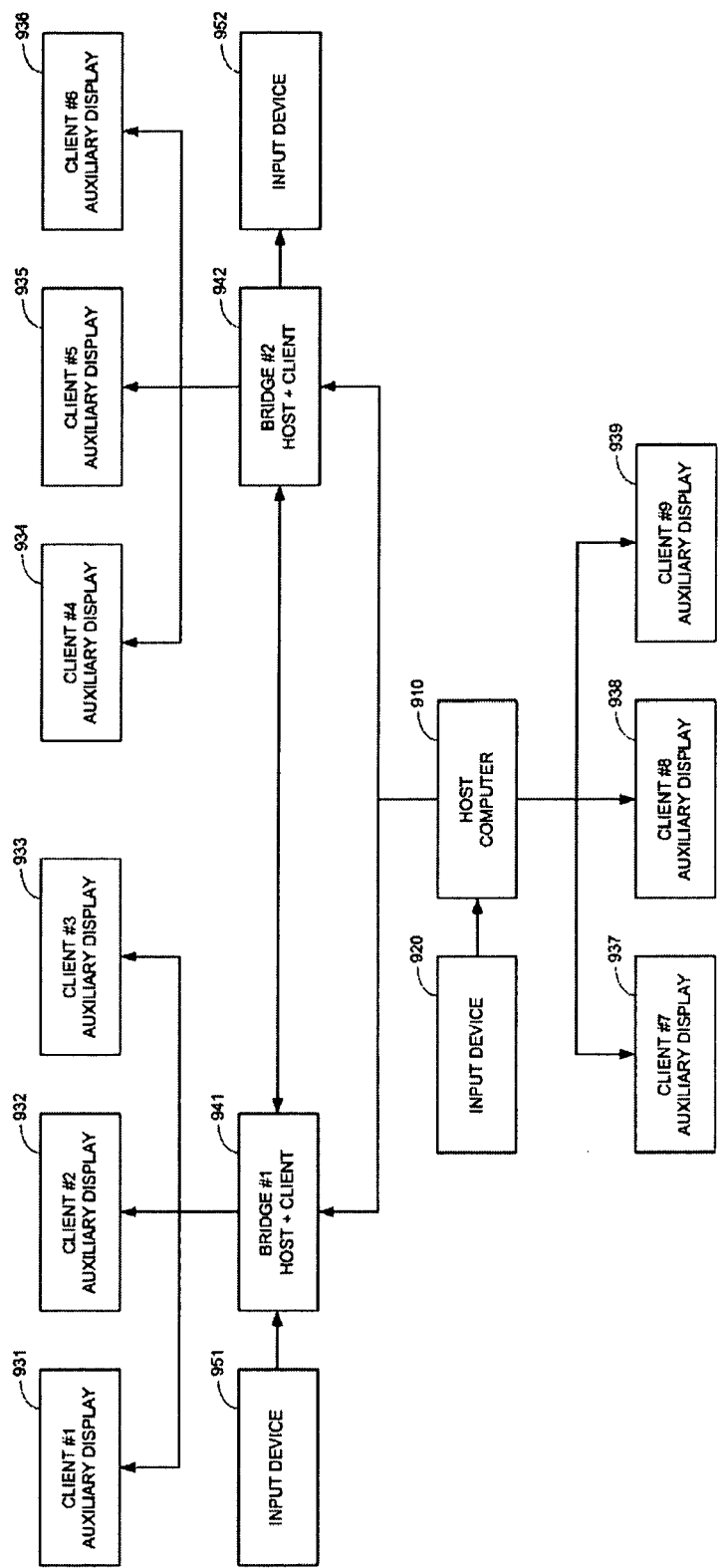
FIG. 9 is a simplified block diagram of auxiliary display devices and bridge devices connected to a computer, in accordance with an embodiment of the present invention.

Reference is now made to FIG. 9, which is a simplified block diagram of auxiliary display devices and bridge devices connected to a computer, in accordance with an embodiment of the present invention. Shown in FIG. 9 is a computer 910 with an input device 920 such as a keyboard or mouse, and auxiliary display devices 931-939. FIG. 9 also includes two devices 941 and 942, referred to as bridges, with respective input devices 951 and 952. Bridges 941 and 942 are connected directly to computer 910 and connected directly to one another. Auxiliary display devices are arranged so that devices 931-933 are connected to bridge 941, devices 934-936 are connected to bridge 942, and devices 937-939 are connected directly to computer 910.

Bridges own two types of gadgets; namely, (i) gadgets generated from their own internal running applications, and (ii) gadgets inherited from other devices. For example, bridge 941 owns its own gadgets, as well as gadgets inherited from host computer 910 and from bridge 942. Auxiliary display devices generally do not own gadgets, and can only display information from gadgets that are presented to them.

Bridge devices 941 and 942 combine capabilities of host computer 910 and client devices 931-939. As clients, bridge devices 941 and 942 receive display information from other devices and present the display information on their own screens. As hosts, bridge devices 941 and 942 act as sources of display information for display on client device screens. For example, bridge 941 may receive display information from computer 910 or from clients 931-933 and display such information on its own screen; and conversely, bridge 941 may transmit display information to computer 910 or to clients 931-933 for display on their screens. Display information transmitted by bridge 941 may be generated by bridge 941 from internal applications running on device 941, or may be information received from other devices. Moreover, bridge 941 can combine display information that it generates from its internal applications with display information that it receives from remote devices, the latter referred to as "inherited notifications", so as to create single display information for devices that connect to bridge 941.

In accordance with an embodiment of the present invention, computer 910 connects to bridges 941 and 942 via wireless links. Although display information is rendered as a bitmap image, it is cumbersome to transmit bitmap images over wireless links, due to their large sizes. Instead, computer 910 transmits display information to bridges 941 and 942 in a compressed XML format. Auxiliary display devices 931-939 generally have limited CPU power and limited software resources, and may only support simpler data, such as BMP image data. In such cases, bridges 941 and 942 transform the display information they receive in compressed XML format to a BMP format, for forwarding to display devices 931-939.

Further in accordance with an embodiment of the present invention, such transformation uses look & feel parameters appropriate to each corresponding display device, as described hereinabove with reference to FIGS. 5A-5C. The XML→BMP transformation performed by bridges 941 and 942 uses configuration information provided by each corresponding target display device, such as the sample XML document described hereinabove, in transforming the compressed XML data to a BMP image for the target display device.

Bridges 941 and 942 may split their displays to include both display information provided by computer 910, as well as display information generated from internal applications running on bridges 941 and 942.

It is noted that the architecture of FIG. 9 enables clients 931-939 to display gadget information that does not originate from host computer 910. As such preferably each bridge device maintains an assignment table that holds data defining which device owns which gadget and which client performs an operation that requires a change of display. General notifications, such as a new e-mail message transmitted by an e-mail gadget, are distributed to all clients 931-939 that use this e-mail gadget. TABLE II is a sample assignment table maintained by bridge device 941.

TABLE II

Sample Assignment Table Maintained by Bridge #1

| Gadget | Owner | Notifications for Change of Display |
|---|---|---|
| E-mail | Client #1 | Client #2, Client #3 |
| Calendar | Client #2 | Client #1 |
| Weather | Client #3 | |

Figure 10:
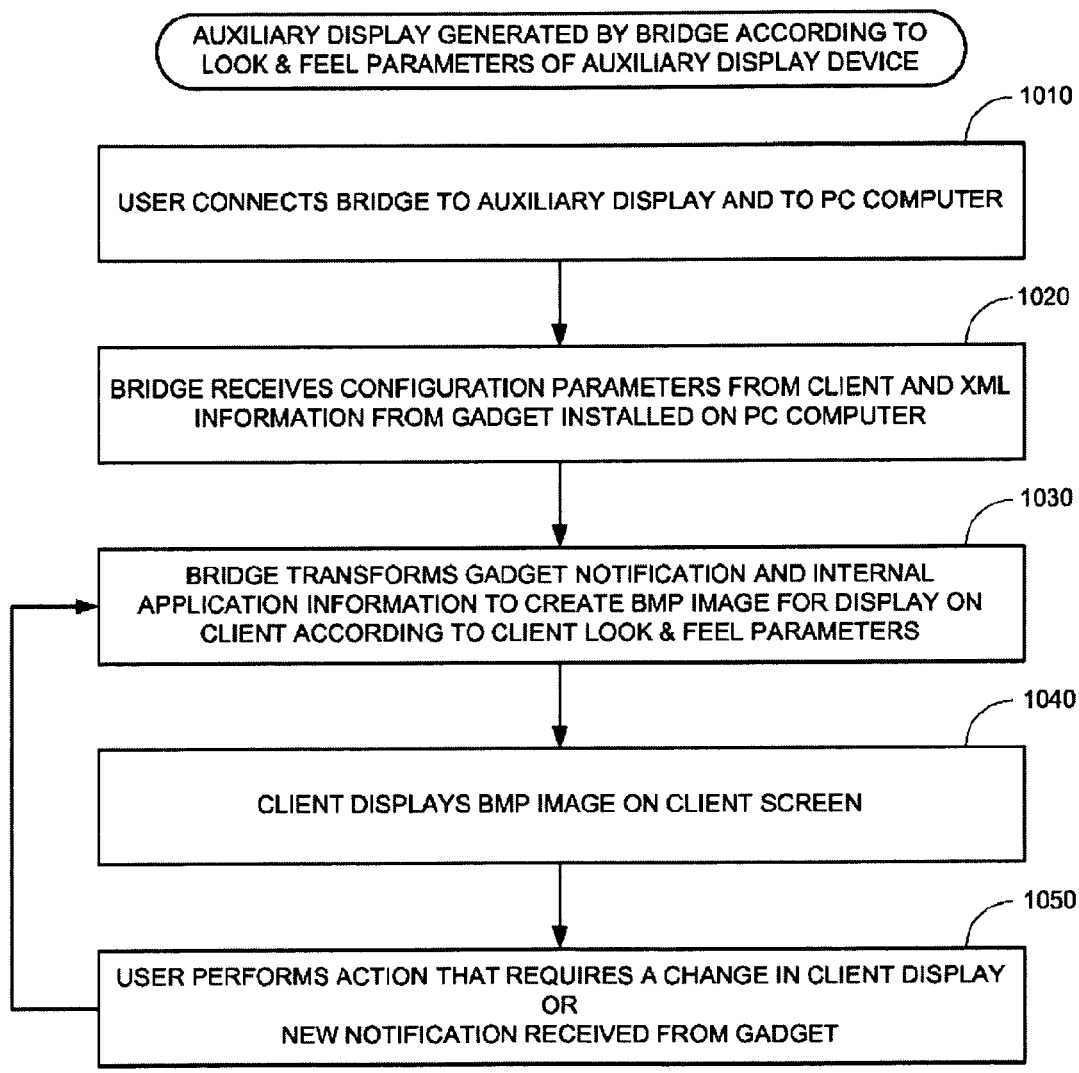
FIG. 10 is a simplified flow chart of a method for generating a display on a bridge device according to look & feel parameters of an auxiliary display device, in accordance with an embodiment of the present invention.

Reference is now made to FIG. 10, which is a simplified flow chart of a method for generating a display on a bridge device according to look & feel parameters of an auxiliary display device, in accordance with an embodiment of the present invention. At step 1010 a user connects a bridge, such as bridge 941, to an auxiliary display device, such as client 931, and to a PC computer, such as computer 910. At step 1020 the bridge receives look & feel configuration parameters from client 931, and XML display information from the gadget installed on computer 910 for device 931.

At step 1030 the bridge transforms the XML display information along with display information generated by applications internal to the bridge, to generate a BMP image for display on the client device, wherein the BMP image conforms to the client device's look & feel parameters. At step 1040 the client device displays the BMP image received from the bridge on its client screen. At step 1050 the user interacts with the client device and performs an action that requires a change in display. Alternatively, at step 1050 a notification is received from the gadget for device 931. In either case, the method proceeds to step 1030 where the bridge generates a new BMP accordingly, as appropriate. Thus the cycle of user interaction/new notifications ← → new BMP image continues.

Referring back to the prior art block diagram of FIG. 8, it is noted that control over which display information is targeted to which client 831-839 is controlled by computer 810. Computer 810 acts as a "crossbar switch", routing gadget data to devices. A user of computer 810 configures the exact display information that is presented to each of the connected auxiliary display devices 831-839.

In accordance with an embodiment of the present invention, control over such display configuration is extended. Referring now to FIG. 9, each host device in FIG. 9 may define which gadgets it wishes to expose to devices connected to it. The host device further designates whether each connected device either (i) has permission to further export the gadget display information to devices that are connected to it, or else (ii) is limited to displaying the gadget display information only on its own display. Such an extended display configuration is set up using a utility presented to the user referred to herein as a gadget configuration utility, or as a "gadget configuration gadget".

A bridge device, such as bridge 941 is a host and, as such has its own gadget configuration utility. The bridge presents the user with bridge internal applications that generate display information, and gadgets provided by hosts connected to the bridge, for those gadgets for which the bridge is permitted to forward their display information. Thus bridge 941, for example, presents the user with its internal applications that generate display information, and with those gadgets for host 910 and bridge 942, for which host 910 and bridge 942 are permitted to forward the gadget's display information to bridge 941.

Figure 11:
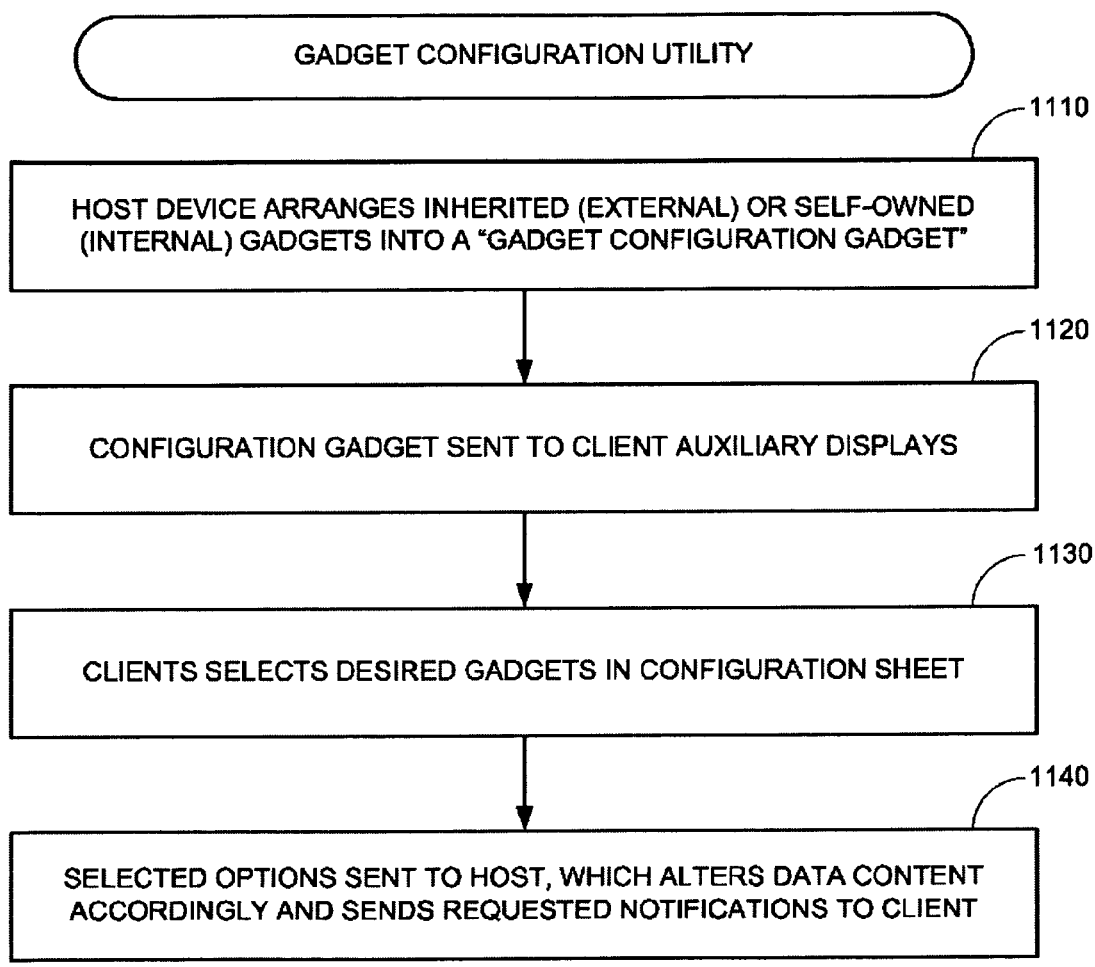
FIG. 11 is a simplified flow chart for a method for a client to control the display information sent to it by a host, in accordance with an embodiment of the present invention.

A client, such as auxiliary display device 931, is not responsible for configuring gadgets. However, in accordance with an embodiment of the present invention, a host may define its own configuration utility as a gadget, which in turn enables the client to control the display information sent to it by the host. In this regard, reference is now made to FIG. 11, which is a simplified flow chart for a method for a client to control the display information sent to it by a host, in accordance with an embodiment of the present invention. At step 1110 a host device arranges its self-owned (internal) gadgets and its inherited (external) gadgets into a gadget configuration gadget. At step 1120 the host device's gadget configuration gadget is sent to client auxiliary displays. At step 1130 a user of the client selects desired gadgets in a configuration display window. At step 1140 the user's selections are sent to the host, which alters its data content accordingly, and sends requested notifications to the client.

For example, referring to FIG. 9, at step 1120 auxiliary display devices 934-936 display gadgets on host computer 910, on bridge 941 and on bridge 942, via bridge 942; and at step 1130 the user can select some or all of these gadgets.

It will thus be appreciated by those skilled in the art that by implementing auxiliary display devices as bridges, display information may be shared between the display devices. In distinction, client devices in prior art architectures behave as passive isolated displays. For example, using the present invention, if client 931 is a GPS device, client 932 is an audio player, and client 933 is a mobile phone, and if these clients are implemented as bridges connected to one another, then each client device 931, 932 and 933 is able to review the other clients' displays.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A host device comprising:
   a display;
   one or more computer processors; and
   one or more computer-readable storage media having instructions stored thereon that, responsive to execution by the one or more computer processors, perform operations comprising:
      presenting, on the display, a host configuration screen user interface having host configuration screen user interface visual elements that the display uses when displaying the host configuration screen, the host configuration screen user interface visual elements including a user interface size, a font style, a font type, a font size, a font color, a background, a menu type, a menu topology, a control topology, a screen template, or transitional entry effects;
      transmitting the host configuration screen user interface visual elements to a client device via a communication network, the host configuration screen user interface visual elements enabling the client device to alter a client configuration screen user interface to have a visual format conforming to the host configuration screen user interface visual elements; and
      receiving, from the client device, the altered client configuration screen user interface and presenting the altered client configuration screen user interface on the display; or
      causing the client device to display the altered client configuration screen user interface on a display of the client device.

2. The host device of claim 1, wherein the communication network is a wired network.

3. The host device of claim 1, wherein the communication network is a wireless network.

4. The host device of claim 1, wherein the host configuration screen user interface includes a control that enables the host device to switch between a host mode of operation and a client mode of operation when the client device is attached to the host device.

5. The host device of claim 1, wherein the host configuration screen user interface includes a plurality of controls, the controls representing user commands supported by the client device when the client device is attached to the host device.

6. The host device of claim 5, the operations further comprising:
   transmitting, to the client device when the plurality of controls are activated, the user commands represented by the plurality of controls; and
   receiving, from the client device in response to the client device receiving the user commands, an element for presenting on the host configuration screen user interface.

7. The host device of claim 1, wherein the host configuration screen user interface enables configuration of the functionality of the host device.

8. The host device of claim 7, wherein the configuration of the functionality of the host device includes defining a function and a location of a multi-function key.

9. A host device, comprising:
   a display;
   one or more computer processors; and
   one or more computer-readable storage media having instructions stored thereon that, responsive to execution by the one or more computer processors, perform operations comprising:
      presenting, on the display, a host configuration screen user interface using a web page for user interaction, the host configuration screen user interface having host configuration screen user interface visual elements that the display uses when displaying the host configuration screen, the host configuration screen user interface visual elements including a user interface size, a font style, a font type, a font size, a font color, a background, a menu type, a menu topology, a control topology, a screen template, or transitional entry effects;
      transmitting the host configuration screen user interface visual elements to a client device via a communication network, the host configuration screen user interface visual elements enabling the client device to alter another web page to have a visual format conforming to the host configuration screen user interface visual elements; and
      receiving, from the client device, the altered web page and presenting the altered web page on the display; or
      causing the client device to display the altered web page on a display of the client device.

10. The host device of claim 9, wherein the host configuration screen user interface is a web browser.

11. The host device of claim 9, wherein the communication network is a wired network.

12. The host device of claim 9, wherein the communication network is a wireless network.

13. The host device of claim 9, wherein the host configuration screen user interface includes a control that an enables the host device to switch between a host mode of operation and a client mode of operation when the client device is attached to the host device.

14. The host device of claim 9, wherein the host configuration screen user interface includes a plurality of controls representing user commands supported by the client device when the client device is attached to the host device.

15. The host device of claim 14, the operations further comprising:

transmitting, to the client device when the plurality of controls are activated, the user commands represented by the plurality of controls; and receiving, from the client device in response to the client device receiving the user commands, a second web page for presenting on the host configuration screen user interface, the second web page different from the web page and the other web page.

16. The host device of claim 9, wherein the host configuration screen user interface enables configuration of the functionality of the host device.

17. The host device of claim 16, wherein the configuration of the functionality of the host device includes defining a function and a location of a multi-function key.

* * * * *

UNITED STATES PATENT AND TRADEMARK OFFICE
CERTIFICATE OF CORRECTION

PATENT NO. : 9,686,145 B2
APPLICATION NO. : 13/612879
DATED : June 20, 2017
INVENTOR(S) : Itay Sherman et al.

Page 1 of 1

It is certified that error appears in the above-identified patent and that said Letters Patent is hereby corrected as shown below:

On the Title Page

Line 1 of the Abstract, after "A" before "client-host" delete "mufti-source" insert --multi-source--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*